United States Patent
Cooper

[15] 3,665,491
[45] May 23, 1972

[54] FOOD HEATING DEVICE

[72] Inventor: Willard Cooper, 379 Burwood Ave., Camden, N.J. 08105

[22] Filed: Feb. 17, 1971

[21] Appl. No.: 116,094

[52] U.S. Cl. ..................................... 219/10.55, 99/DIG. 14
[51] Int. Cl. ............................................................ H05b 9/06
[58] Field of Search ......................... 219/10.55; 126/19, 273; 99/361, 362, 367, DIG. 14

[56] References Cited

UNITED STATES PATENTS

| | | |
|---|---|---|
| 2,612,596 | 9/1952 | Gross.................................219/10.55 |
| 3,271,169 | 9/1966 | Baker et al......................219/10.55 X |
| 3,271,552 | 9/1966 | Krajewski...........................219/10.55 |

*Primary Examiner*—J. V. Truhe
*Assistant Examiner*—Hugh D. Jaeger
*Attorney*—Seidel, Gonda & Goldhammer

[57] ABSTRACT

A microwave oven divided into a plurality of zones. Each zone is operative to generate a different quantity of heat energy. Food trays are provided. The trays are divided into a plurality of compartments. Each compartment is adapted to be aligned with one of the oven zones so that food disposed in that tray compartment is heated to a desired temperature.

8 Claims, 4 Drawing Figures

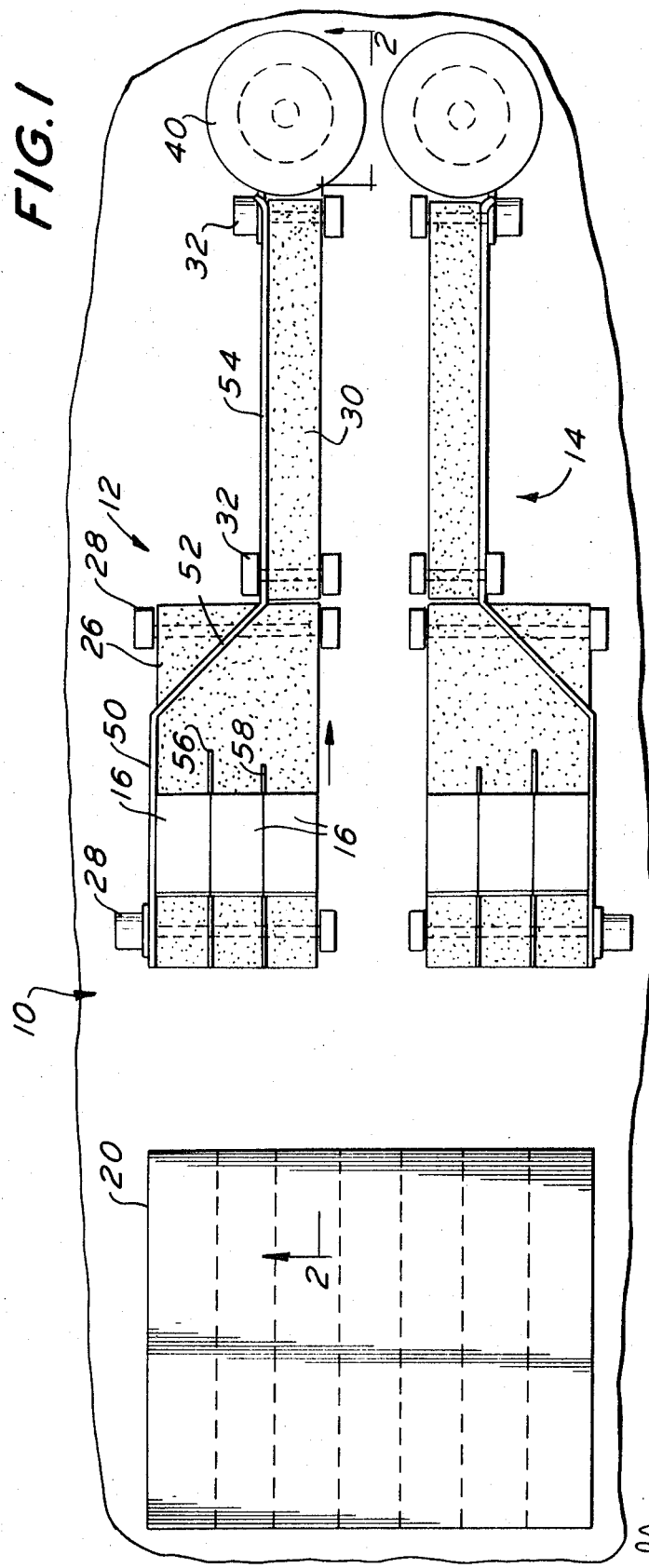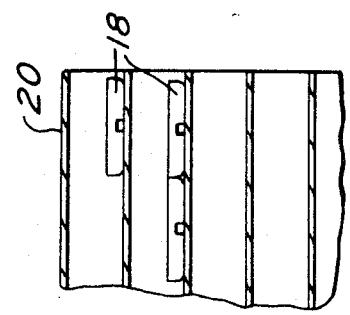

INVENTOR
WILLARD COOPER

BY
Seidel, Gonda & Goldhammer
ATTORNEYS

FOOD HEATING DEVICE

This invention relates to a device for heating foods and more particularly to a device for the rapid heating of foods in a restaurant environment.

Rapid food heating is particularly desirable in restaurants, cafeterias and fast food establishments. Utilization of means for quick heating of food will result in less waiting by patrons, and greater turnover by the establishment with the result of increased profits.

In the past food establishments of the type noted above have tried to precook their foods to a limited extent. Final cooking was delayed until the patron placed an order. In many of the popular low cost fast food establishments, the foods are prepared and often precooked. Then, they must be kept warm until an order is placed. If the food is not purchased within a relatively short period of time then the food must be discarded.

Additionally this latter technique has the disadvantage of being limited only to the heating or cooking of relatively simple items such as hamburgers, hot dogs, fried chicken or the like. Thus, it has not been possible to prepare a full meal for fast food service. Such a meal might include a meat or fish and a number of vegetables or the like. A principle problem with utilizing such an arrangement is that the various items must be cooked or heated for different periods of time. Devices known heretofore have been entirely unsatisfactory for the solving of this problem since, it was not possible to heat the food to be served in a short enough period of time to make it possible to heat it on order and it was not possible to isolate the various foods so that each would be heated to its optimum temperature. Accordingly, it is an object of this invention to provide a novel and unobvious food heater.

It is another object of this invention to provide a novel and unobvious food heater and tray wherein the heater and the tray are complimentary with eachother.

It is another object of this invention to provide a food heater having a plurality of zones, where each of the zones is operative to generate different quantity of heat.

It is still another object of this invention to provide a food heating device which can be conveniently used in restaurants and the like.

Generally, the invention relates to a food heating device. The device comprises an oven. The oven has a partition to divide it into at least two zones. Means for generating different quantities of heat in each of the zones are provided. A food tray is provided. The tray is adapted to be received in the oven. The tray is divided into a plurality of compartments, each of the compartments is adapted to be aligned with one of the zones so that the food in each compartment is heated to a different temperature.

Other objects and advantages of the invention will be apparent from a detailed description thereof which follows wherein a presently preferred form of the invention is disclosed.

FIG. 1 is a plain view of an apparatus employing the invention.

FIG. 2 is a sectional view taken along line 2—2 of FIG. 1.

Figure 3:
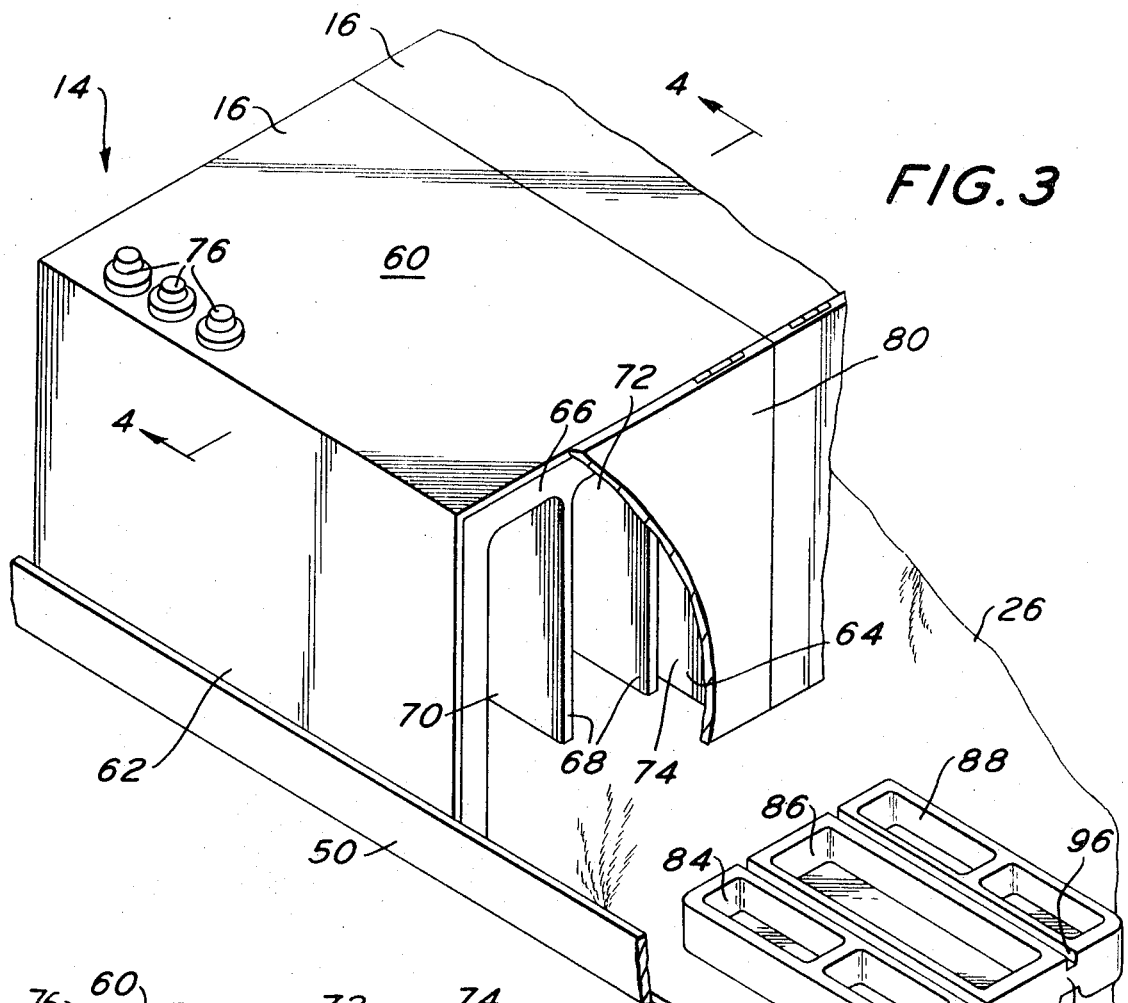
FIG. 3 is a perspective view of one of the ovens forming a portion of the invention.
Figure 4:
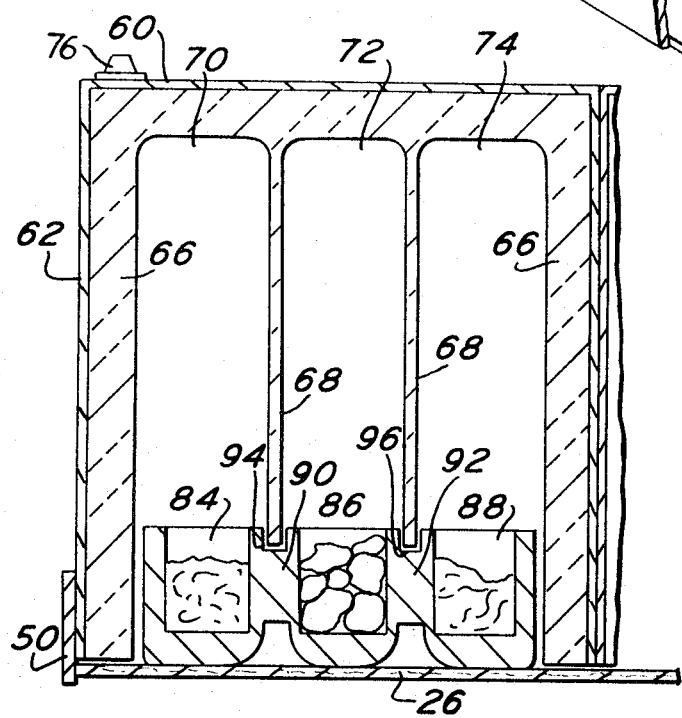
FIG. 4 is a sectional view taken along line 4—4 of FIG. 3.

Now referring to the drawing wherein a detailed description of one presently preferred form of the invention is shown, FIG. 1 shows an oven device 10.

The device includes a right bank 12 and a left bank 14. Both the left and right banks are mirror images of eachother. Accordingly, the remainder of the description of the banks will be confined to bank 12; it being understood that bank 14 is virtually identical thereto.

As will be described in substantial detail herein, each of the banks 12, 14 supports a plurality of ovens 16 which are utilized to heat food which has been precooked and which is stored in its frozen state in trays 18 on a rack 20. As seen in FIGS. 1 and 2 the rack 20 provides a plurality of shelves and partitions so that a substantial number of food trays 18 can be stored thereon. It is contemplated that the trays may be arranged on the rack 30 so that those trays carrying identical foods are stored in the same area. It is apparent that trays holding a wide variety of precooked frozen foods may be carried on the rack. Preferably, the entire menu of the store or restaurant should be in precooked frozen form so that only a minimal amount of food handling is necessary.

Bank 12 as shown in FIG. 2 may be supported on a suitable support member 22. The bank comprises a plurality of ovens 16 shown in side by side parallel relation to eachother. The ovens are carried above the top surface of support 22. A first conveyor belt 26, wide enough to underlie all of the ovens disposed on the bank is entrained over suitable drive members 28 so that its upper surface can be driven in the direction indicated by the arrow.

It is contemplated that trays of frozen food 18, will be moved from the ovens 16 by the conveyor 26.

In end to end relation with the first conveyor belt 26 is a second narrower conveyor belt 30. This conveyor belt is also entrained over drive means 32 and is driven so that it moves to food trays in the same direction as first conveyor belt 26. Thus, food trays will be transferred from the one conveyor belt to the other. If desired, conveyor belt 30 may run faster or slower than conveyor belt 26.

At the end of conveyor belt 30 a rotating serving table 40 is provided. The table may be driven by a suitable electric motor 42 which is connected by means of a gear box 44 to a rotating output shaft 46. Thus, the food trays carried by conveyor 22 are fed onto the rotating serving table 28 where they may be picked up by restaurant personnel or patrons.

The first conveyor 26 comprises an outside relatively high wall 50 having an angled portion 52 merging into a second wall portion 54 adjacent the second conveyor. Thus, food trays emanating from the oven 19 closest to wall 50 will strike angled portion 54 and thus be driven toward the conveyor 30.

To assure that adjacent trays do not collide while coming out of their adjacent ovens, suitable partitions 56 and 58 are provided.

Reference is now made to FIG. 3 wherein one of the ovens on bank 14 is illustrated in detail. The oven is shown with its support structure removed in order to simplify the description. As seen in FIG. 3 the oven includes a top wall 60 and side walls 62 and 64. The conveyor 26 functions as a bottom wall. Suitable insulating material 66 is provided for isolating the oven from the exterior.

A plurality of partitions 68 which extend partially into the oven exterior are supported in downwardly depending relation from the top of the oven so that it is divided into a plurality of separate zones 70, 72 and 74 in side-by-side relation to each other. Since the partitions only extend partially into the interior they define a zone common to zones 70, 72 and 74. In the preferred form of the invention, each of the zones would be provided with a suitable heat generating means. Preferably, such heat generating means takes the form of microwave generating magnatrons. Such devices are well known for generating microwave energy for the purposes of heating foods.

As is well known, the microwave energy does not provide any heating or cooking function until it penetrates the food. Thus, by regulating the amount of time during which the magnatrons in each of the compartments in the oven are energized, it is possible to heat different types of foods simultaneously.

Thus, it is preferred that the magnatrons be controlled by suitable presettable timers 76 which may be energized in a manner to be explained below.

Each oven may have a front door 80 which may be manually raised and lowered to permit the placement of food trays therein. Additionally, a rear door (not shown) may also be provided.

As best seen in FIG. 3, the food tray 17 comprises a plurality of compartments 84, 86 and 88 for receiving food. It should be observed that the compartments 84, 86 and 88 are in generally spaced parallel relation to each other and are connected by webs 90 and 92. Each of the webs in turn defines an upwardly facing notch 94 and 96.

When the tray containing the food is inserted in the common zone in the oven the notches 92 and 96 cooperate with partitions 68 so that each of the zones 70, 72 and 74 within the ovens 16 is isolated from its adjacent zone. Thus, the timers 28 may be preset so that the food in tray compartment 84 is subjected to microwave radiation for one interval of time and the food in compartments 80 and 82 is subjected to microwave radiation for different intervals of time. Thus, the foods in the various compartments of the tray 17 may all be heated to the correct temperature without concern for burning or the like.

Since microwave energy is used, very rapid heating of the foods is achieved. By way of example, a sausage may be heated in about 8 seconds. A chicken may be barbecued in about 50 seconds, a baked potato may be cooked in about 45 seconds.

A suitable control means may be provided for the conveyors and the oven. Thus, appropriate circuitry may be utilized to connect conveyor belt 26 and the timers 76. Accordingly, when a food tray is placed in an oven 16, the timers are energized to heat the food. Deenergization of the timers will cause the conveyor belt to remove the tray from the oven.

Preferably, the food trays 17 are comprised of a transparent plastic material. Additionally, they should also be covered with a transparent plastic material. Thus, they may be moved directly from the storage rack 16 directly into the ovens 19. Since they are covered with transparent material, it is not necessary to remove any part of the covering or rearrange any of the contents in order to allow for the fact that different types of foods require different quantities of heat.

Accordingly, although the invention has been described with reference to one particular embodiment thereof it is apparent that many other forms and embodiments would be obvious to those skilled in the art in view of the foregoing description. Thus, the scope of the invention should not be limited by the foregoing description but rather only by the scope of the claims appended hereto.

I claim:

1. A food heating device comprising an oven, said oven having wall means defining an interior, at least one partition supported by said wall means and extending partially into said interior to divide said interior into at least three zones, the first two of said zones being in side-by-side relation with respect to each other, said third zone being common to said first two zones, heat generating means disposed in each of said first two zones, each of said heat generating means being operable to generate a different heating temperature, and a food tray to be placed in said third zone, said food tray being divided into a plurality of compartments, some of said compartments corresponding to one of said first two zones, the remainder of said compartments corresponding to the other of said first two zones so that food in each of said compartments is heated to a different temperature.

2. A food heating device as defined in claim 1 comprising conveyor means for conveying said tray into and out of said oven, drive means, said drive means being operable when energized to drive said conveyor, and control means, said control means being operative to deenergize said conveyor means when said tray is in said oven, and means for selectively energizing said heat generating means, said selective energizing means cooperating with said control means so that said conveyor means is deenergized when said tray is in said oven and said heat generating means is energized, and said control means is energized when said heat generating means is deenergized.

3. A food heating device as defined in claim 2 wherein said oven has a top wall, said partition extending partially into said interior from said top wall, said compartments being disposed on said tray in side by side relation, web means disposed between said compartments, said web means defining a notch for receiving said partition when said tray is in said oven to isolate adjacent compartments.

4. A food heating device as defined in claim 2 wherein said heat generating means comprises microwave generators and said control means includes selectively energizable timers for said microwave generators, and said tray is transparent.

5. A food heating device as defined in claim 1 including conveyor means disposed below said oven, said conveyor means defining said oven floor, said oven having a top wall, said partition extending partially into said interior from said top wall, said compartments being disposed longitudinally along said tray in side by side parallel relation, said tray including longitudinally disposed web means disposed to intermediate said compartments, said web means defining a longitudinally disposed notch for receiving said partition when said tray is in said oven to substantially isolate adjacent compartments.

6. A food generating device as defined in claim 5 wherein said heat generating means comprises microwave generators, and said control means includes selectively energizable timers for said microwave generators and said tray is transparent.

7. A food heating device as defined in claim 1 wherein said oven has a top wall and a bottom wall, said partition extending partially into said interior from said top wall, said compartments being disposed on said tray in side-by-side relation, web means disposed between said compartments, said web means defining a notch for receiving said partition when said tray is in said oven to isolate adjacent compartments.

8. A food heating device as defined in claim 1 wherein said heat generating means comprises microwave generators, and said tray is transparent.

* * * * *